Aug. 7, 1934.     O. E. BLACK     1,968,985
VACUUM CONTROLLED UNLOADING VALVE
Filed Oct. 27, 1933
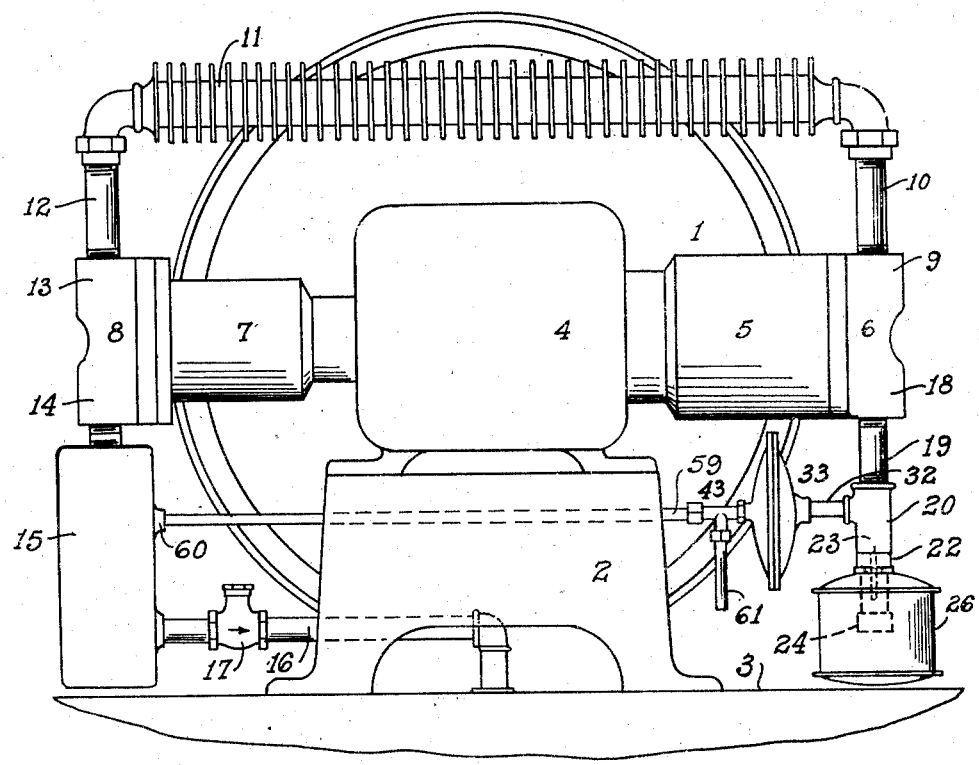
Fig.1.
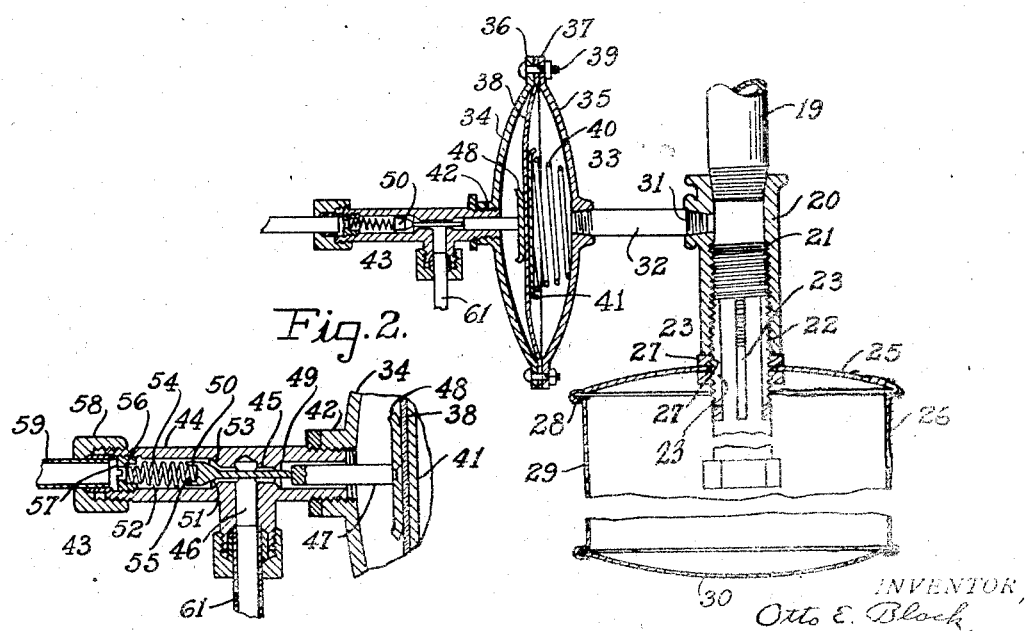
Fig.2.
Fig.3.
INVENTOR
Otto E. Black,
BY
ATTORNEY Patented Aug. 7, 1934

1,968,985

UNITED STATES PATENT OFFICE 1,968,985

VACUUM CONTROLLED UNLOADING VALVE

Otto E. Black, Dayton, Ohio, assignor to The Dayton Air Compressor Company, Dayton, Ohio, a corporation of Ohio Application October 27, 1933, Serial No. 695,477

3 Claims. (Cl. 230—24)

This invention relates to new and useful improvements in vacuum-controlled unloading valves for fluid compressors and the like.

It is one of the principal objects of my invention to provide a vacuum-controlled unloading valve which is actuated from the inlet side of a compressor in such a manner that it will operate unfailingly, regardless of the tank or outlet pressure, or of line current failure that produces a premature stopping of the compressor when motor-operated.

It is still another object of my invention to provide an unloading valve of rugged construction that will not be affected by dust particles in the air lines.

My vacuum controlled unloading valve when given its initial adjustment at the time of manufacture, will not require further or frequent adjustment in the field.

By its positive and unfailing action in instantly relieving the entrapped pressure within the cylinder of a fluid compressor, my unloading valve also prolongs the life of the source of motive power by preventing the burning out of the motor and slipping belts due to heavy loads when starting.

Other important and incidental objects of my invention will be brought out in the following specification and the claims annexed thereto.

In the accompanying drawing illustrating one embodiment of my invention, Figure 1 is a side view of a two stage, opposed, fluid compressor equipped with my vacuum-controlled unloading valve. Figure 2 is a sectional view through my vacuum-controlled unloading valve mechanism, and Figure 3 is an enlarged view of the valve employed with the diaphragm control.

Referring now to the drawing for a complete disclosure of my invention, in Figure 1 I have shown a two-stage opposed fluid compressor 1 mounted on a sub-base 2 and supported upon a storage tank 3.

On oppositely disposed sides of a crank case 4 is a low pressure cylinder 5 having a cylinder head 6, and a high pressure cylinder 7 provided with a cylinder head 8. Attached to the outlet port 9 of the head 6 is a discharge line 10 connected with a lateral cylinder head connector 11, and extending through an inlet line 12 to the inlet port 13 of the head 8. (See Figure 1.)

The discharge port 14 of the head 8 is connected with a vertical cylindrical air chamber 15. The compressed fluid flows from the chamber 15 through a pressure line 16 including a check valve 17, to the storage tank 3. The inlet port 18 of the low pressure head 6 has connected thereto a short nipple 19 to whose lower threaded end of a T fitting 20 is secured. The end of the T opposite the nipple 18, has therein an internally threaded opening 21 in which is adjustably positioned the upper threaded end of a sleeve valve 22. (See Figures 1 and 2.)

The sleeve valve 22 has in the wall of its threaded end a series of circumferentially spaced, open slots 23, through which fluid is admitted to the inlet port 18. The opposite end of the valve 22 is effectively closed by a hexagon cap 24 by which the valve 22 may be screwed into or out of the threaded opening 21 of the T 22 to decrease or increase the length of the openings or slots 23, thus regulating the amount of fluid admitted.

Between the threaded end of the sleeve 22 and the cap 24, the top convex cover 25 of a muffler 26 is firmly held between lock nuts 27—27 on the threaded portion of the sleeve. When the sleeve valve 22 is in its finally adjusted position, the muffler 26 is raised by the lock nuts 27, 27 to a position abutting the lower end of the T fitting 20 to bring the lower ends of the slots 23 within the muffler, as illustrated in Figure 4.

Depending from the crimped edge 28 of the cover 25 are the side walls 29 and perforated convex bottom 30 of the muffler 26, the latter being readily detachable from the cover to effect adjustment of the sleeve valve 22. (See Figures 1 and 2).

Communicating with a lateral opening 31 of the T 20 through a short nipple 32, is a diaphragm housing 33 having oppositely disposed convex heads 34 and 35 between whose adjacent flanges 36 and 37 a flexible diaphragm 38 is securely held by flange bolts 39. Positioned between the diaphragm 38 and the head 35 is a conical compression spring 40 whose one end bears against the inner face of the head 35 and whose opposite end is received by a flanged pressure disc 41 that distributes the spring pressure uniformly over the surface of the diaphragm against which it is forced. (See Figure 2.)

Formed in the center of the head 34, opposite the nipple 32, is a threaded boss 42 which supports an unloading valve 43. As shown in Figure 3, the valve 43 has a T shaped body 44 provided with a passage 45 and intercepting near the center of the body a lateral passage 46. Adjacent the boss 42, the passage 45 is enlarged to receive slidably therein, an actuating pin 47 to whose outer end, within the diaphragm 33 there is secured a disc head 48 which, like the disc 41, bears against the face of the diaphragm 38 from the opposite direction.

The inner end of the pin 47 engages the reduced stem end 49 of a valve 50 which projects through the passage 45 across the lateral passage 46, and has integral therewith an enlarged conical head 51 that enters a counterbore 52 in the end of the body 44 opposite the diaphragm 33. (See Figure 3.)

The counterbore 52 has formed at the bottom thereof a conical seat 53 against which the valve 50 is held by a helical compression spring 54 positioned between a recess 55 in the valve head 51 and a similar recess 56 in the inner face of an apertured plug 57. The latter is screwed in the threaded outer end of the counterbore 52.

Attached to the externally threaded end of the body 44 by a hexagonal nut 58 is one end of a pressure unloading line 59 whose opposite end is connected with a lateral boss 60 on the air chamber 15. Fitted in the lateral passage 46 is one end of a short tube 61, whose opposite open end discharges into atmosphere.

The operation of my vacuum-controlled, pressure unloading valve will now be described. When the compressor is placed in operation, fluid such as air will be drawn into the lower pressure cylinder through the inlet port 18 and the adjustable sleeve valve 22 from the muffler 26, the air being admitted noiselessly to the latter through its perforated cover 30. In the proper adjusted position, the slots 23 will be of reduced adjusted position, the slots 23 will be of sufficiently reduced length to cause a partial vacuum to be created within the diaphragm chamber 33 between the diaphragm disc 38 and the head 35. When this vacuum attains the proper value, it will cause the diaphragm 38 to overcome the pressure of the spring 40, whereupon said diaphragm will be forced away from the head 34 and the disc 48.

The pressure of the spring 54 will now force the valve 50 against its conical seat 53 to prevent the discharge of air through the axial passage 45 and the lateral port 46. The air pressure within the chamber 15 will now gradually build up from atmospheric pressure until its pressure equals the pressure within the tank and is sufficient to open the check valve 17. The compressed air will now flow into the storage tank 3 from the outlet port 9 through the chamber 15.

When the operation of the compressor stops, either by the action of a pressure-controlled switch to shut off the motor, or by stoppage of the motor through line failure or other cause, the diaphragm 38 will be instantly forced toward the head 34 by the pressure of the spring 40. The pressure of the valve spring 54 will then be overcome and the valve 50 held open to relieve the entrapped pressure between the check valve 17 and the piston in the high pressure cylinder 7 and including the compressed air within the chamber 15. By thus relieving the air compressed within the chamber 15, the compressor is enabled to attain its full speed at a gradually increasing load while the pressure builds up within this chamber and before the check valve opens.

If the portion of the slots 23 uncovered by the T fitting 20 is increased, a less vacuum will be produced within the diaphragm chamber 33 and its operation will be more sluggish, but if the openings are restricted by reducing the length of the slots, the diaphragm will respond more rapidly and the valve 50 will close more rapidly.

Although I have shown my vacuum-controlled unloading valve applied to a two-stage, opposed fluid compressor, it also may be used with equal success on single or multiple cylinder fluid compressors.

Due to the large diaphragm employed, pulsations caused by the reciprocating piston do not cause the diaphragm to flutter and with an unloading valve thus actuated, chattering of the check valve is not encountered. The result is a quieter and more efficient operation of the compressor.

Having described my invention, I claim:

1. In a device of the type described, a fluid compressor, a suction line, a pressure discharge line, a restricted inlet for said suction line, a vacuum-actuated diaphragm on said suction line, a pressure relief line connected to said pressure discharge line, a valve in said pressure relief line, and means for closing said valve when a partial vacuum is produced in said diaphragm chamber by the restricted inlet.

2. In a device of the type described, a fluid compressor, a suction line, a pressure discharge line, an inlet for said suction line, having a fluid admission opening adjustable in size, a vacuum-actuated diaphragm on said suction line, a pressure relief line connected to said pressure discharge line, a valve in said pressure relief line, and means for closing said valve when a partial vacuum is produced in said diaphragm chamber by a restricted fluid admission in the inlet.

3. In a device of the type described, a compressor, a suction line, a pressure discharge line, a vacuum-actuated diaphragm on said suction line, means for admitting air to said diaphragm, a pressure relief line connected to said pressure discharge line, a valve in said pressure relief line, and means for opening said valve when air is admitted to said vacuum-actuated diaphragm chamber upon cessation of operation of the compressor.

OTTO E. BLACK.